April 30, 1946.  J. T. CLARK  2,399,324
INFLATED SOFT BALL
Filed Oct. 4, 1943

Inventor:
John T. Clark,

Patented Apr. 30, 1946

2,399,324

UNITED STATES PATENT OFFICE 2,399,324

INFLATED SOFTBALL

John T. Clark, West Chicago, Ill., assignor to Wintark, Incorporated, a corporation of Illinois Application October 4, 1943, Serial No. 504,810

8 Claims. (Cl. 273—60)

This invention relates to an inflated soft ball and the method of preparing the same.

Soft balls or indoor baseballs have heretofore always been made by building up a core of relatively inelastic material and covering it with an appropriate cover usually of leather. The core is selected in such manner that the ball will have relatively poor elastic qualities and so that the ball may be handled without the usual precautions required for a so-called hard baseball. The ball must also be dead enough that its travel will be limited.

Heretofore inflated balls have not had the proper inertia and elasticity characteristics which would make possible their use for soft ball purposes. The present invention is a soft ball which consists primarily of a hollow air-filled center surrounded by a bladder and having a wall which is relatively very thick for an inflated ball and which is so produced as to lack the elasticity characteristics common to inflated balls and yet produce a soft ball having the qualities of the ordinary wound soft ball. The present ball has all of the playing characteristics of the soft ball and yet is weather-proof, waterproof and will outwear the ordinary soft ball by a tremendous margin.

Figure 1:
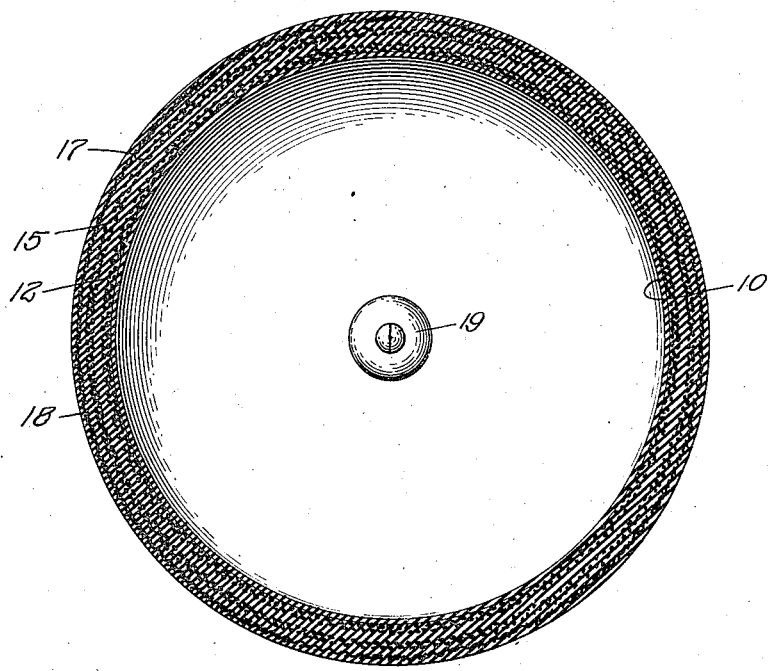
Figure 2:
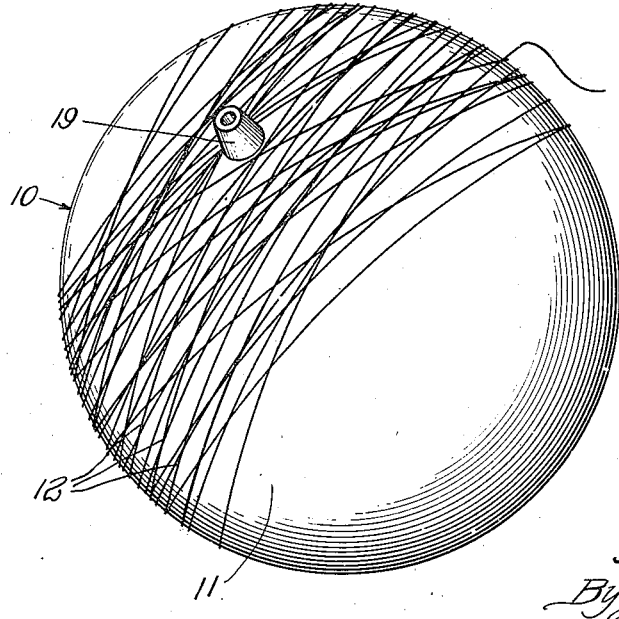
Figure 3:
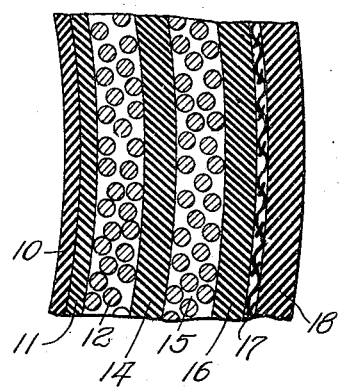

The invention is illustrated in the drawing in which Fig. 1 is a cross-section through the middle of the ball; Fig. 2 is a perspective view of the bladder in course of manufacture; and Fig. 3 is an enlarged detail view of a section through the wall.

In its preferred form the ball comprises a relatively thick inner bladder 10 upon the surface of which is a layer 11 of what is originally tacky soft gum rubber applied in sufficient thickness to cement the next layer 12 of cord material to the bladder. For the sake of explanation, these layers are shown as independent in Fig. 3, but actually the cord layer will be deeply embedded into the layer of tacky rubber. Upon the cord is a relatively thick layer of a rubberized material which is treated to provide unusual rigidity and stiffness. Upon this layer is a second layer 15 of cord followed by a second layer 16 of the relatively rigid rubberized material. This layer may be followed by a fabric layer 17 and a rubber cover 18.

In assembling the ball the bladder 10 is inflated to the proper size and coated with a thin layer of tacky rubber material. This layer serves as an adhesive and any form of adhesive may be employed which does not interfere with the action of the ball. A rather heavy layer of cord is then lightly wound around the bladder without destroying it, the cords being wound on substantially great circles so as to cover the ball uniformly. The lower cords are embedded in the layers of tacky adhesive. This layer of cord, which preferably may be made up of ordinary 16-4s string, should be made of considerable thickness. For an ordinary soft ball which may vary in diameter from approximately 4 to approximately 5 inches, this layer will ordinarily be from $\frac{3}{32}$ up to as much as $\frac{3}{16}$ inch in thickness. After it has been wound, it is covered with a rubbery material which imparts the necessary rigidity and deadness into the ball. A preferred composition for this purpose comprises a mixture of ordinary rubber such as pale crepe rubber with a depolymerized rubber or its equivalent. The preferred material for this purpose is that known as Isolac, for example, Isolac-P prepared by the Du Pont Company, or a cyclized Pliolite rubber such as prepared by the Goodyear Company known as Pliolite. The following formula has proved extremely good:

| | | |
|---|---|---|
| Pale crepe rubber | lbs | 6¼ |
| Isolac-P | lbs | 3 |
| Reclaim rubber (70% reclaim) | lbs | 1½ |
| Whiting | lbs | 4½ |
| Zinc oxide | lbs | ¾ |
| Stearic acid | oz | 2.4 |
| Accelerator, such as Zenite-A | oz | 1.8 |
| Antox | oz | 1.8 |
| Sulfur | oz | 4 |

The Isolac-P comprises approximately one-third crepe rubber and two-thirds depolymerized rubber. It may be replaced in the above formula by 3½ lbs. of Goodyear Pliolite D-30 T-14.

This compound in plastic form is coated on the cord and impregnates it. Enough material is added to produce a layer from $\frac{1}{16}$ to $\frac{1}{8}$ inch in depth.

While this material is still tacky, a second layer of cord 15, about the same thickness as the first layer, is applied, and, upon this, a second layer 16 of the deadening rubber compound. The ball is then ready for the cover which may comprise a suitable rubber covering material but preferably includes a layer of frictioned canvas 17 upon which the rubber covering is applied.

Inflation of the ball is taken care of by a rubber valve 19.

The ball may be molded and vulcanized in any suitable manner as is well known in the industry. For example, see Winterbauer Reissue Patent No. 21,115.

It is of course necessary that the ball as a whole have the same weight as the ordinary soft ball of the same size. The wall thickness is, therefore, ultimately controlled to produce this weight. It may vary in size, however, depending upon the density of the ingredients and the manner in which they are put together. The ordinary ball will have a wall of not less than approximately ¼ inch thickness up to nearly ½ inch in thickness.

It is believed desirable in the structure of the ball that there be the two layers of deadening material with a layer of cord between them. The depolymerized rubber adds considerable rigidity and inflexibility to the intermediate layers. As a result, the cord is not permitted the freedom of stretching in movement which it would otherwise have, and the combination of the cord and these two layers of relatively rigid material is believed to produce a desirable deadening effect.

The entire ball, when inflated to the desired pressure, which is usually from 7 to 9 lbs., has playing characteristics almost indistinguishable from the ordinary thread-wound leather covered ball. It may of course be provided with a leather cover if desired, but such a cover does not have the wear resistance or the waterproofness or even the anti-friction characteristics which can be imparted to a suitable rubber cover. The completed ball is of course free of seams, and the experience with rubber coated inflated balls of the Winterbauer type indicates that these soft balls would have an indefinite life.

The term "hollow center" as herein used means a ball in which the solid cover comprises only a minor proportion of the diameter of the ball.

The foregoing detailed description has been given for clearness of understanding only, and no unnecessary limitations should be understood therefrom.

What I claim as new and desire to secure by Letters Patent is:

1. An indoor baseball comprising a hollow center, a wall enclosing the center, a valve connecting the center to the outside of the ball, said wall including an inner bladder member, a cord winding upon the bladder, a relatively stiff rubbery compound impregnating at least part of the cord layer, and a cover, the ball when inflated having the playing characteristics of an indoor baseball.

2. An indoor baseball comprising a hollow center, a wall enclosing the center, a valve connecting the center to the outside of the ball, said wall including an inner bladder member, a cord winding upon the bladder, a relatively stiff rubbery compound impregnating at least part of the cord layer, and a rubber cover, the ball when inflated having the playing characteristics of an indoor baseball.

3. An indoor baseball having a hollow center, a valved bladder enclosing the center, a cord winding enclosing the bladder and affixed thereto by a rubbery adhesive, a relatively dead inflexible rubber composition layer enclosing the cord and embedded therein, a second layer of cord thereover, a second layer of stiffened rubbery material over the second layer of cord, and a cover thereover.

4. A soft ball comprising a hollow center, a valved bladder enclosing the center and a corded wall cemented to the bladder and includes as a stiffening ingredient a substantial proportion of depolymerized rubber.

5. An indoor baseball having a hollow center, a valved bladder enclosing the center, a cord winding enclosing the bladder and affixed thereto by a rubbery adhesive, a relatively dead inflexible rubber composition layer enclosing the cord and embedded therein, a second layer of cord thereover, and a cover thereover.

6. An indoor baseball comprising an air-filled flexible bladder occupying a large proportion of the volume of the ball and provided with a valve, a cord winding cemented to the bladder, a relatively stiff rubbery compound impregnating at least a part of the cord layer, a second layer of cord outside of the rubbery compound, and a rubber cover, the ball having the standard weight of an indoor baseball of the same size and having the playing characteristics of an indoor baseball.

7. An indoor baseball as set forth in claim 1 in which the relatively stiff rubbery compound impregnating at least a part of the cord layer comprises a mixture of natural rubber and depolymerized rubber with the natural rubber present in greater quantity than the depolymerized rubber.

8. An indoor baseball as set forth in claim 1 in which the relatively stiff rubbery compound impregnating at least a part of the cord layer comprises a mixture of natural rubber and cyclized rubber with the natural rubber present in greater quantity than the cyclized rubber.

JOHN T. CLARK.